(12) United States Patent
Baldine et al.

(10) Patent No.: US 7,496,295 B2
(45) Date of Patent: Feb. 24, 2009

(54) OPTICAL-INCLUSIVE DWDM LOCAL AREA NETWORK

(75) Inventors: Ilia Baldine, Durham, NC (US); Laura Jackson, Cary, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 944 days.

(21) Appl. No.: 10/268,424

(22) Filed: Oct. 10, 2002

(65) Prior Publication Data

US 2004/0071469 A1 Apr. 15, 2004

Related U.S. Application Data

(60) Provisional application No. 60/328,191, filed on Oct. 10, 2001.

(51) Int. Cl.
*H04J 14/00* (2006.01)
(52) U.S. Cl. .......................................... 398/69; 398/63
(58) Field of Classification Search ............ 398/58–64, 398/68, 69, 70, 71
See application file for complete search history.

(56) References Cited

U.S. PATENT DOCUMENTS

| | | | | |
|---|---|---|---|---|
| 4,761,832 | A * | 8/1988 | Gade et al. | 398/45 |
| 5,101,290 | A * | 3/1992 | Eng et al. | 398/51 |
| 5,351,146 | A * | 9/1994 | Chan et al. | 398/58 |
| 6,594,234 | B1 * | 7/2003 | Chard et al. | 370/236 |
| 2004/0208554 | A1 * | 10/2004 | Wakai et al. | 398/54 |

FOREIGN PATENT DOCUMENTS

| | | |
|---|---|---|
| EP | 0 472 296 A1 | 2/1992 |
| EP | 0 614 291 A1 | 9/1994 |

OTHER PUBLICATIONS

Guo et al. "Scalable High-Speed Protocols for WDM Optical Star Networks," 13$^{th}$ IEEE INFOCOM proceedings, vol. 3, pp. 1544-1551, Jun. 12-16, 1994.*
Chlamatac I, et al. "Quadro-stars: high performance optical WDM star networks" Countdown to the new millennium. Phoenix, Dec. 2-5, 1991, Proceedings of the global telecommunications conference, New York, IEEE, US, vol. 3, Dec. 2, 1991, pp. 1224-1229, XP010042661, ISBN: 0-87942-697-7, p. 1224, right hand column paragraph 3, p. 1225, left hand column, paragraphs 1,2.
Nen-Fu Huang., et al. "A multicast model for WDM-based local lightwave networks with a passive star topology." Proceedings of the region ten conference. Oct. 19-21, 1993, vol. 3, Oct. 19, 1993, pp. 470-473.

(Continued)

*Primary Examiner*—Christina Y Leung
(74) *Attorney, Agent, or Firm*—Oblon, Spivak, McClelland, Maier & Neustadt, P.C.

(57) ABSTRACT

An optical-inclusive, dWDM local area network and the accompanying signaling protocol necessary to facilitate communication between nodes in a network. This network architecture provides for a packet-oriented network, independent of the number of nodes and the number of supported wavelengths, and provides for scheduled access to the medium, which guarantees higher utilization.

24 Claims, 9 Drawing Sheets

OTHER PUBLICATIONS

Kazovsky L. G., et al, "Starnet: A Multi-gigabit-per-second Optical LAN Utilizing a Passive WDM Star." Journal of Lightwave Technology, IEEE, New York, US, vol. 11, No. 5/6, May 1, 1993, pp. 1009-1027.

Mukherjee B., et al "WDM-based local lightwave networks. I. Single-hop systems." IEEE Network, IEEE Inc. New York, US, vol. 6, No. 3, May 1992, pp. 12-27.

Guo, D., et al. "A Media-Access Protocol for WDM Star-Coupler Networks with Non-Equidistant Stations." Communications-Gateway to Globalization, Proceedings of the Conference on Communications, Seattle, Jun. 18-22, 1995, New York, IEEE, US, pp. 1288-1295, XP000533185.

"Channel Access Protocol for Multi-Wavelength Fiber-Optic Network." IBM Technical Disclosure Bulletin, IBM Corp, New Yor, Us, vol. 32, No. 10B, Mar. 1, 1990, pp. 430-433, XP000097943.

Chipalkatti, Renu., et al. "Protocols for Optical Star-Coupler Network Using WDM" Performance and Complexity Study. IEEE Journal on Selected Areas in Communications, IEEE Inc. New York, US, vol. 11, No. 4, May 1, 1993, pp. 579-589, XP000402616.

Leich, M., et al. "Proposal of an AII-Optical LAN Using Distance Multiplexing For Protocol Free transmission." Proceedings of the Annual Conference on European Fibre Optic Communications and Networks (EFOC), 1994, pp. 106-108, XP 009026624.

* cited by examiner

OPTICAL-INCLUSIVE DWDM LOCAL AREA NETWORK

CROSS REFERENCE TO RELATED APPLICATIONS

This application claims benefit of U.S. Provisional Application No. 60/328,191, filed Oct. 10, 2001, the contents of which are incorporated herein by reference.

FIELD OF THE INVENTION

The present invention relates to communication networks and, more particularly to an all-optical, dense wavelength division multiplexing (dWDM), local area network.

BACKGROUND OF THE INVENTION

Optical networks employing wavelength division multiplexing (WDM) are now a viable technology for implementing a next-generation network infrastructure that will support a diverse set of existing, emerging, and future applications. WDM bridges the gap between the lower electronic switching speeds and the ultra high transmission speeds achievable within the optical medium. WDM divides the enormous information carrying capacity of a single mode fiber into a number of channels, each on a different wavelength and operating at the peak electronic speed, making it possible to deliver an aggregate throughput on the order of terabits per second. As such, WDM is the solution of choice for providing a faster networking infrastructure that can meet the explosive growth of networking, and in particular, the Internet, in the near future.

WDM technology initially was deployed in point-to-point links and has also been extensively studied, both theoretically and experimentally, in wide area or metropolitan area distances. A number of WDM local area testbeds have also been implemented or are currently under development.

While optical communication links are common in core and metropolitan networks, the progress has been slower in the area of access and especially local area networks (LANs). The telecom industry, in general, prefers to accept traditional LAN concepts. In this regard the industry is more likely to expand on the success of a bus-based broadcast network, such as Ethernet by adopting new standards thereof, for example GigE (Gigabit Ethernet) and 10 GigE (10 Gigabit Ethernet) standards.

Industry reluctance has been fueled by many factors, including the reality that an all-optical LAN requires a completely new set of components, such as tunable lasers, tunable filters, passive star couplers and the like. These devices have only recently matured, in terms of technological advancement and cost effectiveness, to the point where implementation of such devices at the LAN level can be effectively and cost-efficiently realized. Thus, the need exists to develop a dense WDM (dWDM), all-optical architecture for a local area network and an accompanying signaling protocol to facilitate communications between nodes in the all-optical local area network.

SUMMARY OF THE INVENTION

This invention provides an optical-inclusive, dWDM network and the accompanying signaling protocol necessary to facilitate communication between nodes in the network. This network architecture distinguishes itself from previous network architecture in that it provides for a packet-oriented network, independent of the number of nodes and the number of supported wavelengths, and provides for scheduled access to the medium, which guarantees higher utilization.

The present invention employs a passive star coupler as a broadcast medium to connect all nodes in the network. Since the entire path between source and destination in such a network is entirely optical, and no electro-optic conversion of the signal is necessary, these networks are also known as single-hop WDM networks. The number of wavelengths utilized by the network is assumed to be smaller than the potentially large number of nodes. The Layer 3 protocol could be either Internet Protocol version 4 (IPv4), Internet Protocol version 6 (IPv6) or any other suitable protocol.

Communication in the optical-inclusive, dWDM network of the present invention is collision-free due to the use of a non-preemptive gated scheduling protocol. A single master node in the network calculates and disseminates the schedule, while other nodes use this schedule to time the transmission of data to their peers. There are two types of nodes in the network of the present invention: candidate nodes, which are eligible to serve as the master node should the current master node fail, and slave nodes, which are not candidates to be the master node. Such a distinction is necessary because a network will likely be composed of servers and workstations, where the workstations lack the necessary computing resources to perform the master node's duties. Furthermore, workstations may allow low priority user access, making them vulnerable to security attacks that could disrupt the network.

The network of the present invention utilizes a Fast Tunable Transmitter-Slowly Tunable Receiver (FTT-STR) approach, where fast implies low to sub-microsecond tuning times while slow implies hundreds of microseconds to tens of milliseconds. For packet transmission and scheduling purposes the lasers are considered tunable and the receivers fixed. However, in order to balance the load in the network, the receivers may be retuned from time to time, on the order of seconds.

The network architecture of the present invention differs from other optical WDM networks currently under development in several respects: (1) it operates within a broadcast-and-select environment, (2) it is collision-free, and (3) it is packet-switched instead of circuit-switched. At the same time, the network architecture of the present invention provides for such important LAN features as native QoS support and multicast.

BRIEF DESCRIPTION OF THE DRAWINGS

Figure 1:
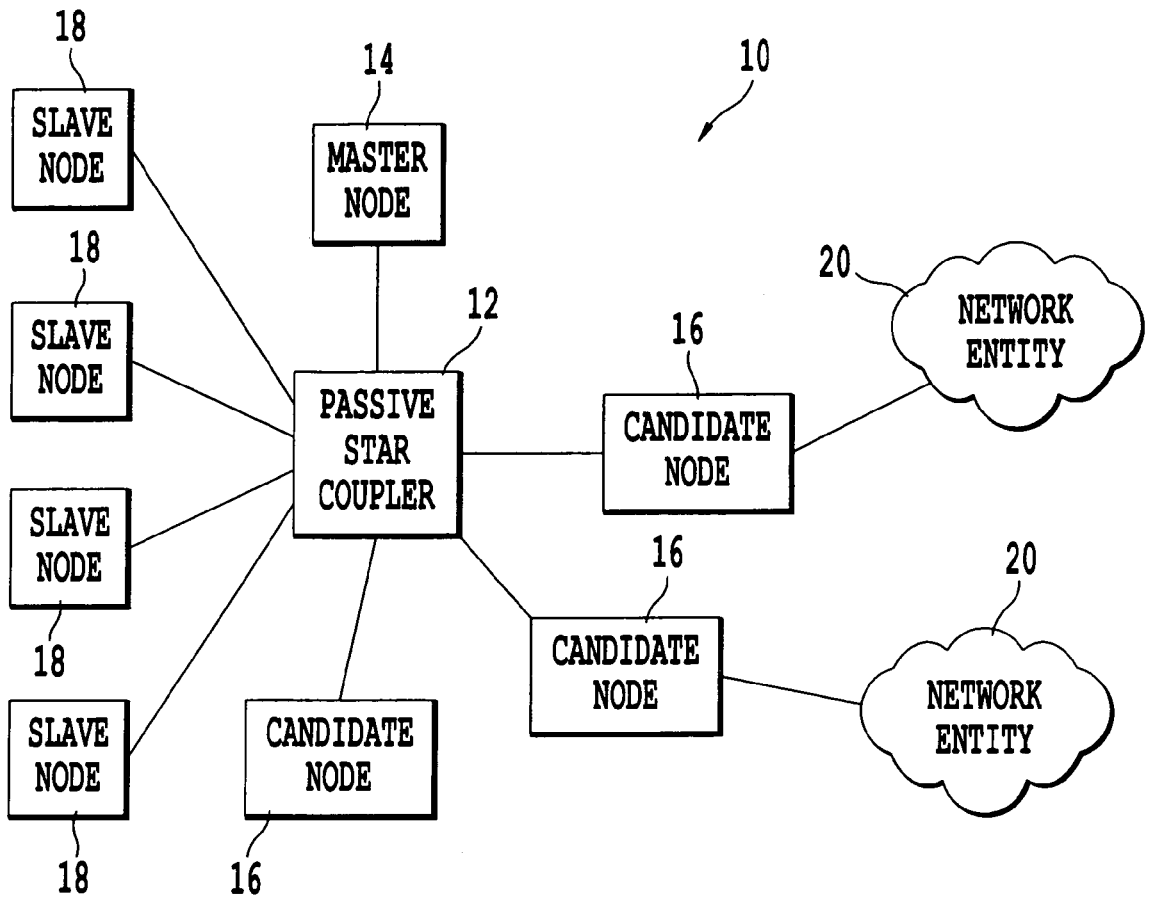

Having thus described the invention in general terms, reference will now be made to the accompanying drawings, which are not necessarily drawn to scale, and wherein:

FIG. 1 is a block diagram an optically-inclusive, dWDM network, in accordance with an embodiment of the present invention.

Figure 2:
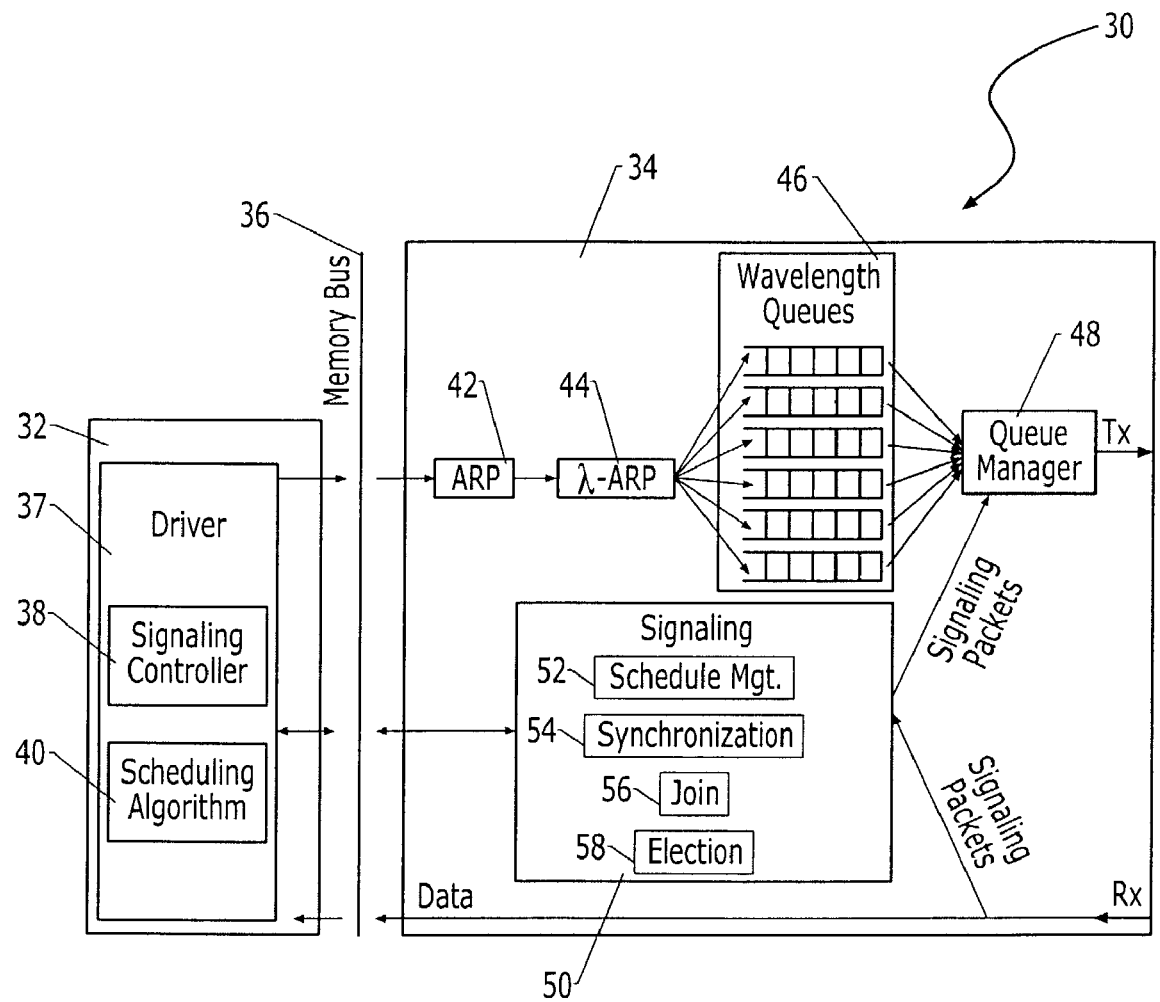

FIG. 2 is block diagram of hardware and software modules within an optical-inclusive, dWDM network node, in accordance with an embodiment of the present invention.

Figure 3:
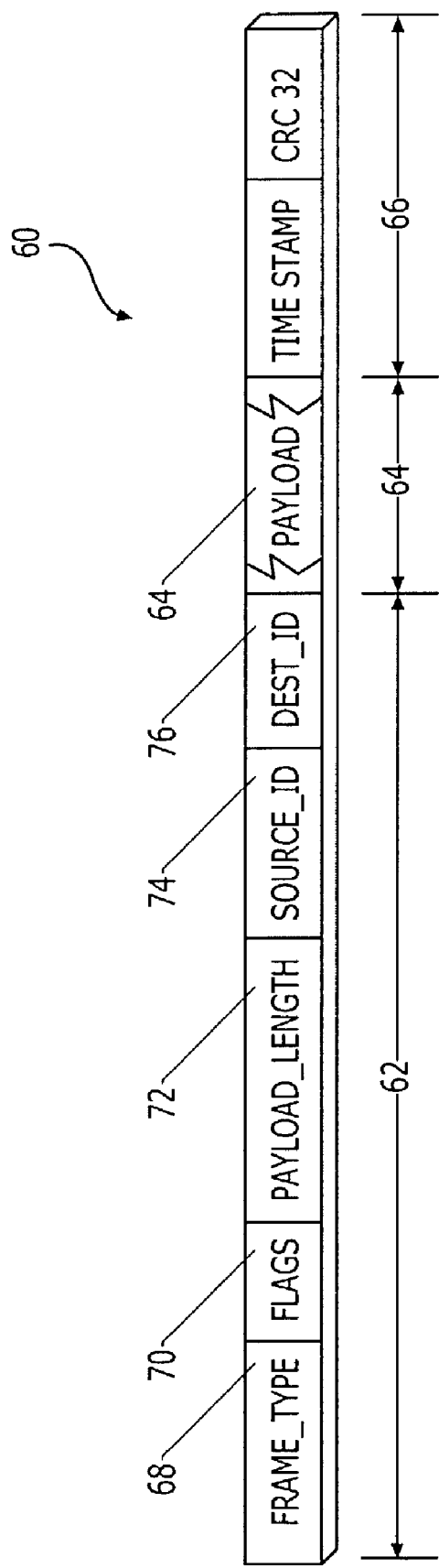

FIG. 3 is an example of the structure of a generic frame within the network of the current invention, in accordance with an embodiment of the present invention.

Figure 4:
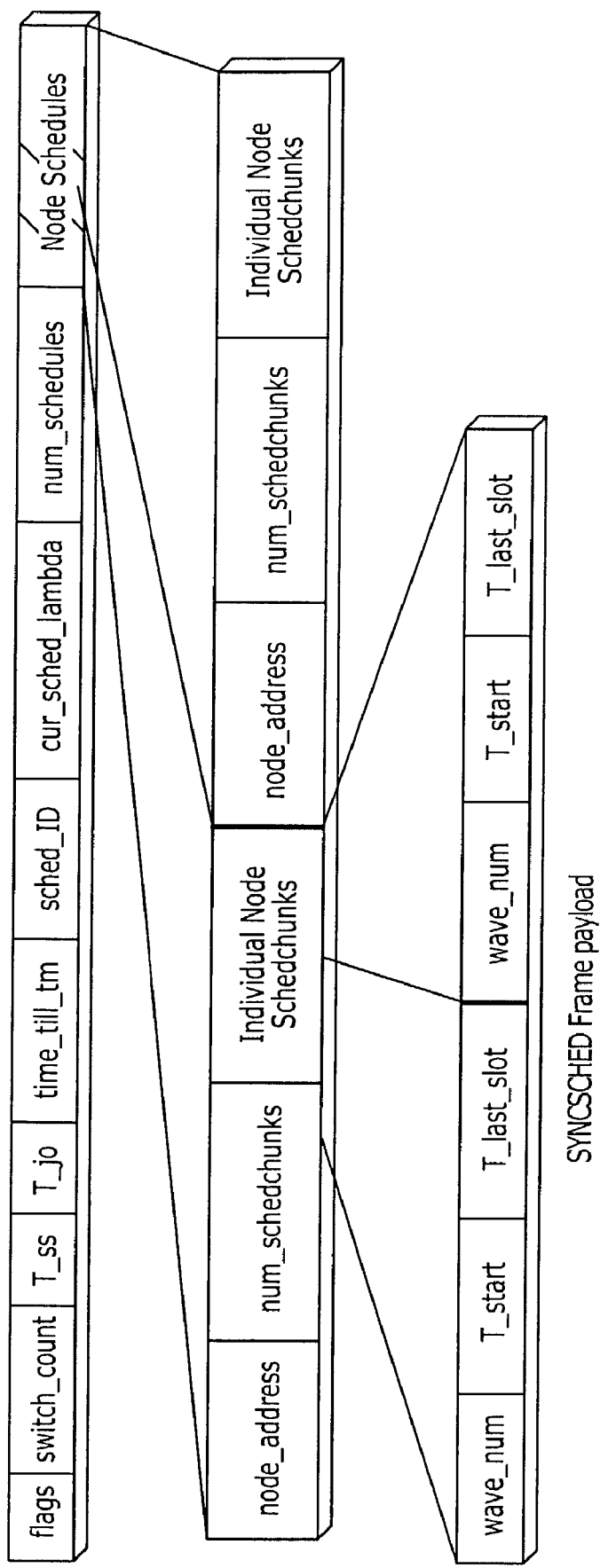

FIG. 4 is an example of the structure of a SYNCSCHED frame payload, in accordance with an embodiment of the present invention.

Figure 5:
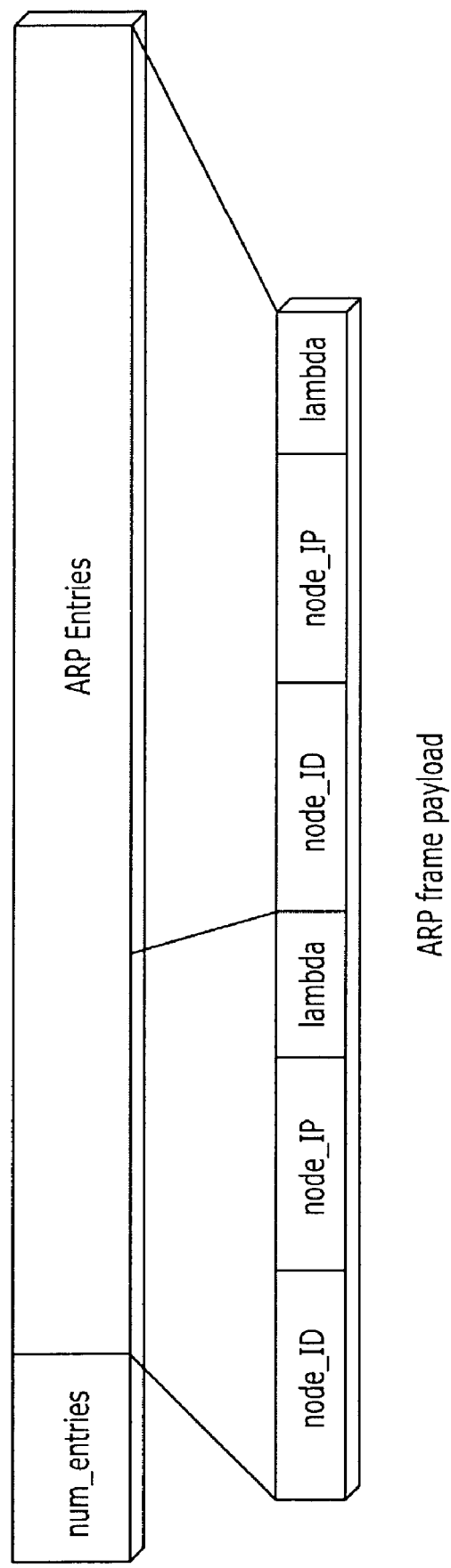

FIG. 5 is an example of the structure of an ARP frame payload, in accordance with an embodiment of the present invention.

Figure 6:
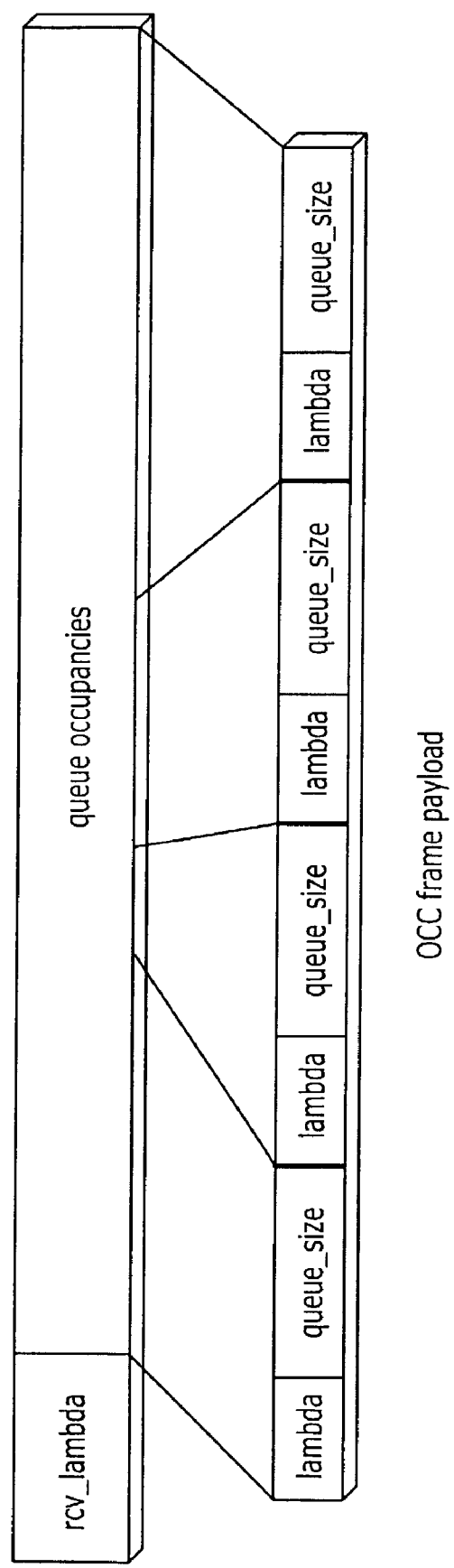

FIG. 6 is an example of the structure of an OCC frame payload, in accordance with an embodiment of the present invention.

Figure 7:
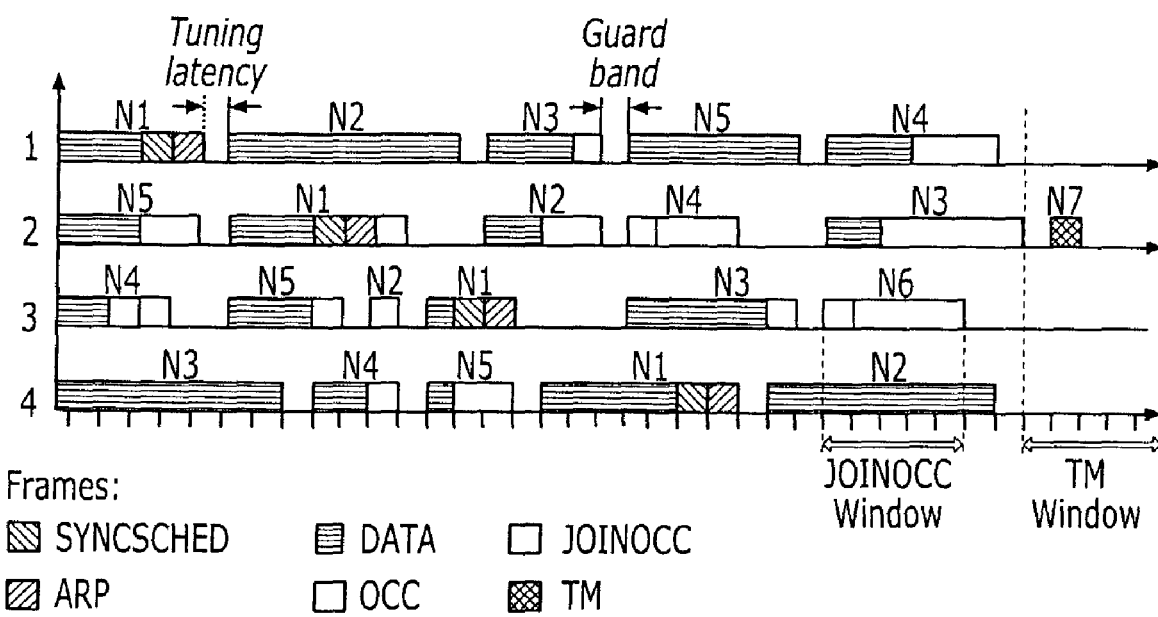

FIG. 7 is an example of various frames and windows within the superframe structure, in accordance with an embodiment of the present invention.

Figure 8:
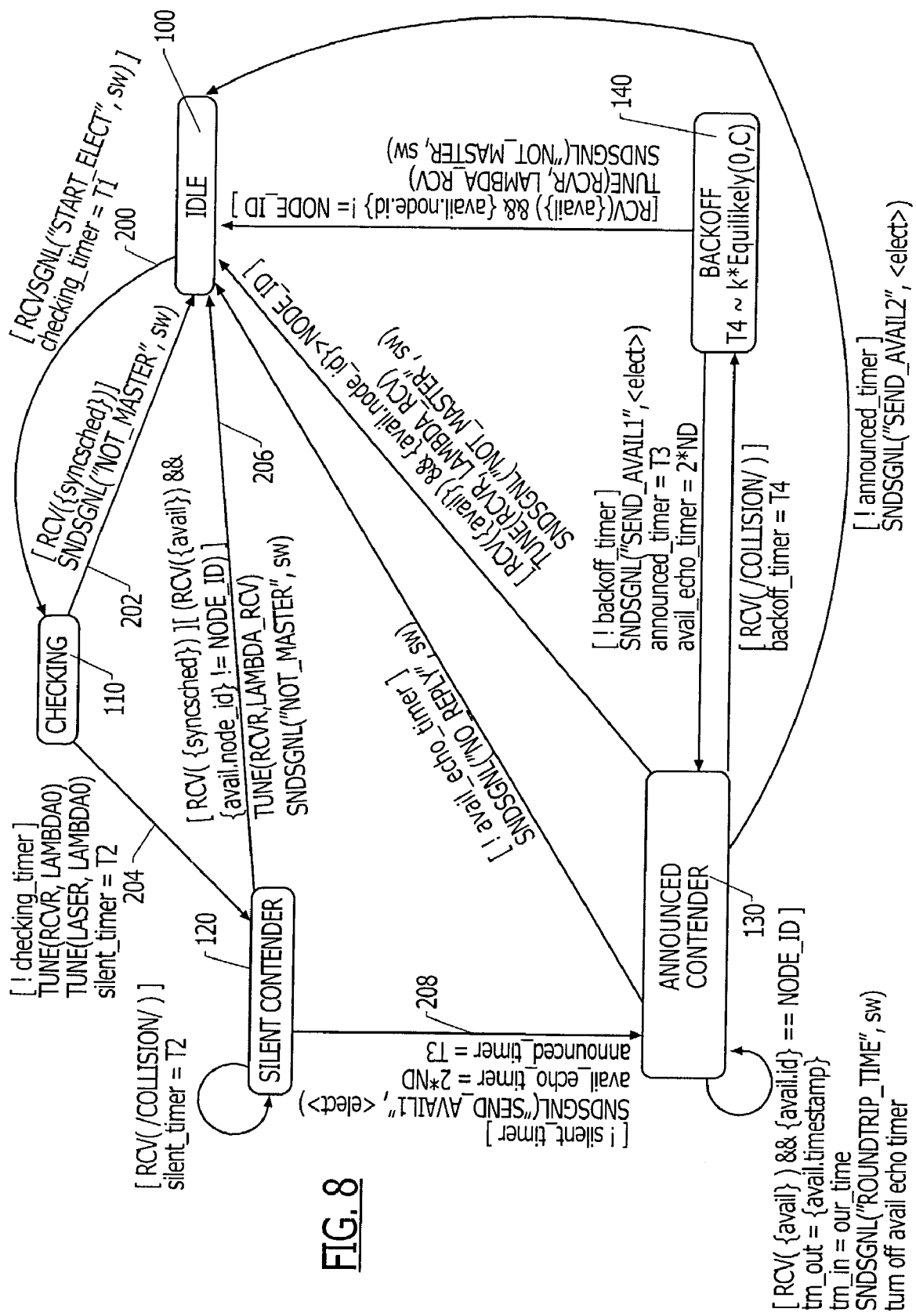

FIG. 8 is state diagram of the receive and transmit hardware state machines implementing election mode >elect<, in accordance with an embodiment of the present invention.

Figure 9:
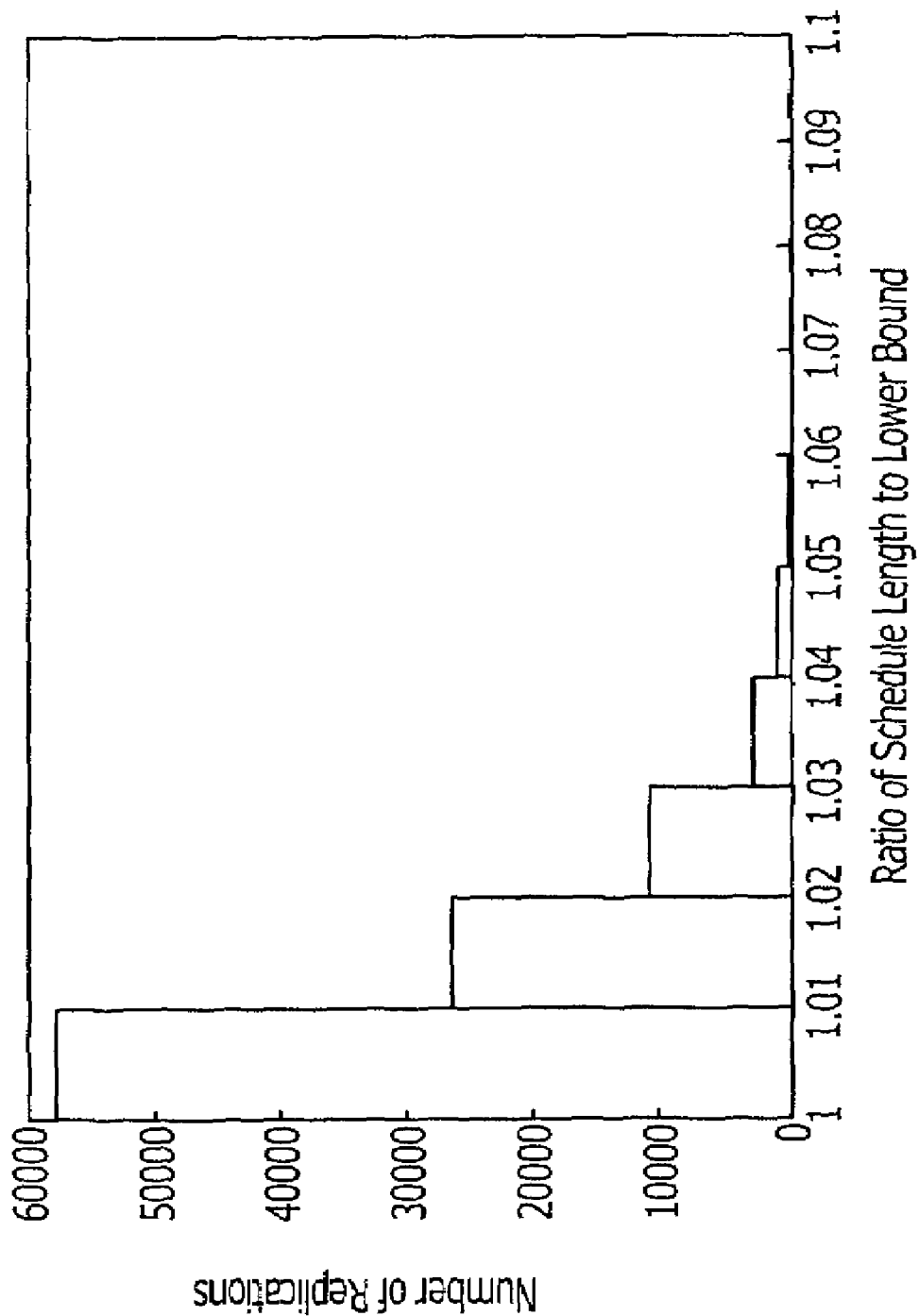

FIG. 9 is a histogram diagram of the performance of a network scheduler implemented in a balanced traffic demand environment, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The Optically Inclusive dWdM Network

In accordance with an embodiment of the present invention, FIG. 1 illustrates a block diagram of an all-optical, dWDM, local area network 10. At the hub of the all-optical, dWDM, LAN is a passive star coupler 12. The passive star coupler implements passive components and serves to couple all of the input optical signals coming from fiber optic communication medium to all of the output fiber optic communication medium acting as receivers. In this regard, the passive star coupler is in optical communication with every node in the all-optical, dWDM LAN. A single master node 14 in the network calculates and disseminates the schedule, while other nodes use this schedule to time the transmission of data to their peers. There are two types of nodes in the network of the present invention: candidate nodes 16, which are eligible to serve as the master node should the current master node fail, and slave nodes 18, which are not candidates to be the master node. In the diagram shown, the master node was a candidate node prior to being elected by the collective candidate nodes as the master node. If the master node should fail, the collective candidate nodes will elect from amongst the candidate nodes a new master node. The election process is further detailed below and forms an integral portion of the present invention. The master node, candidate nodes and slave nodes may be in further communication with network entities 20, such as the Internet or specific intranets.

The candidate nodes of the present invention are equipped with fast tunable transmitters and slowly tunable receivers to form what is known as a FTT-STR architecture. The fast tunable transmitters are further defined as transmitters operating with about 1 microsecond to about 1000 nanosecond tuning times while the slow tuning receivers are further defined as receivers operating with about 100 microsecond to about 100 millisecond tuning times. For functions such as packet transmission and scheduling which operate at fine time scales (i.e., in the order of packet transmission times), the lasers are considered tunable and the receivers are considered as fixed-tuned. The tune-ability of optical receivers is invoked only at longer time scales (i.e., in the order of seconds or hundreds of milliseconds) to address the issues of load balancing and multicast. In other words, we distinguish two regions of network operation: during the normal operation phase, the optical receivers remain fixed-tuned to their home channels, while during the reconfiguration phase, the receivers are slowly retuned to new home channels in order to optimize the network for the next normal operation phase.

The dWDM Network Node Architecture

FIG. 2 shows the high-level design of various hardware, software, and firmware components of a node 30 in the optically inclusive, dWDM network, in accordance with an embodiment of the present invention. A memory module 32, such as a Random Access Memory (RAM) module resides in candidate nodes and candidate nodes that become master nodes. The memory module 32 is in communication with a network adapter 34 via memory bus 36. The memory bus may comprise a 64-bit Peripheral Component Interconnect (PCI), PCI-X or a similar data bus. The RAM module 32 includes a driver module 37, which represents the series of executable instructions that are implemented by the network adapter 34. The driver module may physically exist as software embodied within the candidate node or as a separate firmware entity that remotely communicates with the network node. The driver module comprises two sub-modules, (1) a signaling controller module 38 that coordinates the operation of all other driver module software (i.e., the scheduling algorithm) and network adapter hardware/firmware, and (2) a scheduling algorithm module 40 that calculates new schedules based on queue occupancies provided by all the nodes in the network. In application, the scheduling algorithm will be invoked relatively infrequently; either in response to changes in the traffic pattern or after a predetermined period of time has elapsed.

The network adapter 34 typically resides on a Network Interface Card (NIC) in a network node and incorporates hardware and firmware components. The network adapter will include an ARP (Address Resolution Protocol) table 42 and λ-ARP 44 table that enable a network node to perform IP-to-MAC (Internet Protocol to Medium Control Access) address resolution and MAC-to-receive-wavelength resolution, respectively. The master node stores the ARP and λ-ARP mappings and distributes them via ARP frames to all other nodes. Outgoing IP packets are buffered in the wavelength queues 46 on a per-wavelength basis prior to transmission. The queue manager 48 serves the wavelength queues and controls which frames are transmitted during a specified time period.

The network adapter 34 further comprises a signaling module 50, that includes four sub-modules that govern the necessary signaling actions: schedule management module 52 forms and processes frames related to scheduling, synchronization module 54 enables all communication to occur in hard real time, join module 56 contains the procedure for a node to join the network, and election module 58 is invoked when a master node fails and all candidate nodes take part in the election of a new one.

In transmission mode, data packets are transmitted from the memory module 32 to the network adapter 34 via the memory bus 36. Information from the ARP table 42 and the λ-ARP table 44 is used to determine which outgoing wavelength queue 46 the packets are to be placed in prior to transmission. The scheduling algorithm 40 is implemented on the elected master node and scheduling information is communicated to the signaling module 50 of the network adapter 34 via the memory bus 36. The signaling module 50 communicates, the schedule and associated signaling packets to the queue manager 48. The queue manager 48 uses the schedule to determine which queue to service (i.e., transmit data packets residing in the queue on the wavelength that corresponds to the queue).

Alternately, in receiving mode, the data packets, and the signaling packets are received at the network adapter 34. The signaling packets are filtered from the standard data packet flow and are sent to the signaling module 50 for further processing. The data packets are forwarded across the memory bus to the controlling Operating System (OS) and subsequently forwarded to the user's host.

The Implementation of the dWDM Adapter Schedule

In order to understand the scheduling implemented by the dWDM adapter of the present invention it is necessary to detail how information is transmitted in the network. The time required to complete the transmissions of one full schedule in the all-optical, dWDM network is referred to as a superframe. A superframe further consists of frames, which are continuous sequences of octets transmitted by nodes on individual wavelengths; the different frame types are summarized in Table 1. The network of the present invention uses non-preemptive schedules; in other words, within each superframe a node transmits on a particular wavelength at most once.

TABLE 1

Network frame types

| Frame | Function |
| --- | --- |
| DATA | Carries regular data |
| MDATA | Carries multicast data |
| TM | Measures roundtrip delay to PSC (Passive Star Coupler) |
| OCC | Transmits queue occupancies to master node (Routine mode) |
| JOINOCC | Transmits queue occupancies to master node (Join mode) |
| SYNCSCHED | Carries scheduling information |
| ARP | Carries MAC to wavelength index mapping (λARP) |
| OAM | Carries error and management information about network state |
| AVAIL | Announces availability of a candidate node to become the master node during scheduler election |

Each frame includes a header, a variable length payload and a trailer. In accordance with an embodiment of the present invention frame structure is illustrated in FIG. 3. The frame 60 includes a header portion 62, a variable length payload portion 64 and a trailer portion 66. The header portion includes the frame type indicator 68, one octet of flags 70, the payload length indicator 72 and the source and destination addresses 74, 76 (i.e., the MAC address of the originator and destination of the frame). The trailer portion includes a timestamp 66 that marks the departure time of the frame and a CRC32 (Cyclic Redundancy Check 32) checksum field 68.

The source and destination addressing scheme of the present invention is compatible with both Internet Protocol version 4 (IPv4) and Internet Protocol version 6 (IPv6) addressing formats to allow for direct mapping of addresses from the IPv4 and IPv6 protocols into the MAC addresses of the network of the present invention. Similarly, multicast addresses can be used as destination MAC addresses for multicast communications in the network of the present invention.

In accordance with the frames types specified in Table 1, the following details the frame formats of the individual frame types.

DATA Frame

The DATA frame payload will comprise an IPv4 or IPv6 data packet. The use of a timestamp field in the DATA frame is optional.

MDATA Frame

The MDATA frame payload will comprise an IPv4 or IPv6 multicast packet. The use of a timestamp filed in the MDATA frame is optional.

SYNSCHED Frame

The SYNCSCHED frame is sent to the all-nodes link-local multicast address. The SYNCSCHED frame is transmitted from the master node (i.e., the scheduling entity) to all nodes in the network and carries node-specific scheduling information. SYSCHED frames transmitted on a particular wavelength ($\lambda_i$) will only include node schedules for those nodes in the networks that are receiving data on the $\lambda_i$ wavelength. Upon receipt of a SYNSCHED frame, each node stores its schedule until the time comes to initiate the use of the new schedule. Special flags in the header of the SNCHSCHED frame indicate transition phase from one schedule to the next.

In a network of the present invention that comprises a large number of nodes, the schedule for all the nodes receiving data on a particular wavelength may not fit into a single SYNCSCHED frame. In this instance, multiple consecutive instances of the SYNCSCHED frame are scheduled and transmitted on that particular wavelength. This is undertaken because a node's schedule is never fragmented across frames. Hence, if a node's complete schedule cannot fit into the remainder of the SYNCSCHED frame, the schedule is transmitted in the next occurring frame. These multiple instances of the SYNCSCHED frame are transmitted in sequence and are non-pre-emptive. To indicate that more SYNCSCHED frames are forthcoming, a flag in the frame header is set in all consecutive frames except the last one in the series.

Each SYNCSCHED frame includes the network header, the SYNCHSCHED payload and the trailer. The SYNCHSCED frame payload structure is shown in FIG. 4 and the individual fields that comprise the SYNCSCHED payload are described in Table 2.

TABLE 2

| Field Name | Description |
| --- | --- |
| flags | Current state of the schedule and protocol |
| switch_count | Countdown to the new schedule (in conjunction with active_bit) |
| T_ss | Offset (from the start of the superframe) of this SYNCSCHED frame |
| time_till_tm | Time (in slots) from the SYNCSCHED frame to the TM window (If the flags show the presence of a TM window in this superframe) |
| T_jo | Offset (from the start of the superframe) of the JOINOCC window |
| sched_ID | Scheduling node's MAC address |
| cur_sched_lambda | Scheduling node's listening wavelength |
| num_schedules | Number of individual node schedules in this frame |
| node_address | Address of the node for which the following schedule is intended |
| num_schedchunks | Number of schedchunks in the node's schedule |
| wave_num | ID of the wavelength for this schedchunk |
| T_start | Offset (from the start of the superframe) of the first slot in which the node may transmit on this wavelength |
| T_last_slot | Offset (from the start of the superframe) of the last slot in which the node may transmit on this wavelength |

ARP Frame

The master node (i.e. the scheduling node) transmits Address Resolution Protocol (ARP) frames on every wavelength in order to disseminate the MAC address-to-wavelength ID mapping for all nodes in the network. Each ARP frame carries an integral number of such mappings.

If all of the mappings do not fit into a single ARP frame, the master node may schedule and transmit a number of ARP frames. Similar to the procedure utilized for excessive schedules and multiple SYNCSCHED frame transmission on one wavelength, the multiple ARP frames are transmitted in sequence and are not pre-emptive. To indicate that more ARP frames are forthcoming, a flag in the frame header is set in all consecutive frames except the last one in the series. However, unlike the transmission of multiple SYNCSCHED frames where the frames differ based on wavelength, the transmission of multiple ARP frames involves transmitting the same series of ARP frames on every wavelength in the network.

Each ARP frame includes the network header, the ARP payload and the trailer. The ARP frame payload structure is shown in FIG. 5 and the individual fields that comprise the ARC payload are described in Table 3.

TABLE 3

| Field Name | Description |
|---|---|
| num_entries | Indicates the number of ARP entries in this frame |
| node_ID | Contains the MAC address of the node in the mapping |
| node_IP | Contains the IP address of the node in the mapping |
| lambda | Contains the wavelength number in the mapping |

TM Frame

The Time Measurement (TM) window is an interval of time provided on each wavelength at the end of the schedule to allow new nodes to measure their delay time to the PSC (Passive Star Coupler). This delay time is referred to as PSC offset. A new node transmits a time stamped TM frame to itself during the TM window to determine the PSC offset. The difference between the timestamp of the TM frame and the receipt time of the TM frame is defined as the roundtrip delay of the PSC. The PSC offset is one-half of the roundtrip time.

The TM frame includes the network header, an empty payload and the time stamped trailer.

OCC Frame

Each node in the network informs with the master/scheduling node of its packet queue occupancies by transmitting an Occupancy (OCC) frame to the master/scheduling node. The master scheduling node uses this aggregate information to produce a new schedule that better accommodates the current load demands of the nodes in the network. The master/scheduling node must always reserve enough time on its receive wavelength for each node in the network to transmit an OCC frame.

Each OCC frame includes the network header, the OCC payload and the trailer. The OCC frame payload structure is shown in FIG. 6 and the individual fields that comprise the OCC payload are described in Table 4.

TABLE 4

| Field Name | Description |
|---|---|
| rev_lambda | Receive wavelength number of the source node |
| lambda | Wavelength number for the queue |
| queue_size | Queue size of the associated wavelength |

JOINOCC Frame

The JOINOCC frame is transmitted by a new node in the network to the master/scheduler node to indicate the presence of the node in the network. The JOINOCC frame is similar to the OCC frame and additionally has a flag set in the network frame header indicating that the transmitting node is a new node in the network. Unlike the OCC frame that is transmitted routinely during allocated time on the master node's receive wavelength, the JOINOCC frame is transmitted on the master nodes receive wavelength during the JOINOCC window in the schedule (as defined by a field in the SYNCSCHED frame).

AVAIL Frame

The AVAIL frame is sent by candidate nodes during the master/scheduling election process to indicate that the candidate node is available to become the master/scheduling node in the network. The AVAIL frames comprise a network header, an empty payload and a trailer having an optional timestamp.

OAM Frame

The Operation Administration and Management (OAM) frame is sent by nodes in the network and carry additional management information between the nodes in the network.

The master node (shown in FIG. 1) calculates the schedule based on other nodes' packet queue occupancies, which it learns through the OCC frames sent by other nodes during routine network operation. Once calculated, the schedule is then broadcast on each wavelength inside the SYNCSCHED frame, which the master node transmits on every wavelength every superframe. A schedule contains intervals of time, referred to herein as windows, during which a particular node may transmit a frame.

FIG. 7 shows the position of various frames and windows within a superframe, in accordance with an embodiment of the present invention. In this example, the network comprises seven nodes; N1-N7, and communications are broadcast on four wavelengths; C1-C4. For the example shown in FIG. 7, N1 is the master node and its receive wavelength is $\lambda 3$. There is a JOINOCC window on $\lambda 3$ (with a JOINOCC frame in it), and there is an attached TM window at the end of the superframe. Two nodes are in different stages of joining the network: N6 is sending a JOINOCC frame containing its queue occupancy information to the master node so that it can be included in the next schedule. Meanwhile, N7 is performing Time Measurement; its TM frame can be seen inside the TM window. Time measurement is the first operation a new node must perform when joining the network, in order to synchronize frame reception and transmission.

All-Optical, dWDM Network Operation

The operation of a node in the network of the present invention can be described by separating operation into six different modes shown in Table 5.

TABLE 5

| Modes of operation of a network node | |
|---|---|
| Mode name | Mode purpose |
| Time Measurement | a new node measures its propagation delay to the PSC |
| Join | a new node contacts the master node with its bandwidth requirements |
| Election | a candidate node participates in the election of a new master node |
| Routine | a node transmits and receives data and related signaling frames |

TABLE 5-continued

Modes of operation of a network node

| Mode name | Mode purpose |
| --- | --- |
| Scheduling | same functions as routine, plus must create and distribute new schedules |
| Error | error detection, report and recovery |

Election Mode

The network of the present invention is initialized either at the inception of the network or when nodes come up after having been completely powered down. At the initialization phase no master node has yet been designated, no frames are traveling in the network, and no synchronization/scheduling information is available. The first task to be undertaken during this initialization phase is the election of a master node; candidate nodes enter Election Mode while slave nodes sleep.

Whenever a candidate node fails to detect the presence of a master node, i.e., no SYCNSCHED frames are heard within a pre-determined amount of time, and then the candidate node enters Election Mode. This situation can occur when the network comes up after having been completely powered down, or when an operational master node suddenly fails.

Slave nodes, by comparison, are capable neither of serving as a master node nor of participating in the election of one. Therefore, whenever a slave node fails to detect the presence of a master node, it enters a sleep state for a short time. Upon emerging, the slave node listens for SYNCSCHED frames that indicate the presence of a master node, and if none is heard, the slave node will remain in the sleep state. A slave node may re-enter the sleep state a fixed number of times before giving up (and moving to Error Mode, explained in detail below).

Election Mode assumes that candidate nodes are equipped with slowly tunable receivers. If candidate nodes are only equipped with fixed receivers, then a network administrator must designate the master node.

Election Mode is illustrated in the receive and transmit hardware state machines >elect< and <elect>, shown in FIGS. 8 and 9, respectively. In FIG. 8, the scheduler election process begins when the state machine moves from an IDLE state 100 to a CHECKING state 110 upon receipt of an >elect< signal, transition 200. The node listens on its receive wavelength for a SYNCSCHED frame, which would indicate the presence of a master node and a return to the IDLE state, transition 202. If none is heard within a time T1, the node moves to SILENT CONTENDER state 120, tuning both the node's receiver and transmitter to $\lambda_0$, transition 204. At this state the node listens for either a SYNCSCHED frame, indicating the presence of a master node and a return to the IDLE state or an AVAIL frame, indicating that another candidate node is the ANNOUNCED-CONTENDER, transition 206. In either scenario, the node drops out of the election, retunes its receiver to its original receive wavelength, and then joins the network by proceeding through Time Measurement and Join modes.

If neither a SYNCSCHED nor an AVAIL is heard within a time T2, the node transmits an AVAIL1 frame on $\lambda_0$ and, after hearing its own transmission, and moves to the ANNOUNCED-CONTENDER state 130, transition 208. At this state the node listens on $\lambda_0$ for a time T3: so long as the node hears no AVAIL with a higher MAC ID during the interval T3, it will win the election and become the master node.

However, while in the ANNOUNCED-CONTENDER state, the node could hear an AVAIL with a higher MAC ID. In this case, the node will take itself out of the election and become a NON-SCHEDULER; the other candidate node with the higher MAC ID has precedence in the election process.

If, on the other hand, the node detects a collision while in the ANNOUNCED-CONTENDER state, it enters the BACKOFF state 140 for a random amount of time (T4). Other candidate nodes involved in the collision will also enter the BACKOFF state, each choosing a different T4. The candidate node whose T4 expires first will try again to transmit AVAIL1 (if a tie exists, a collision occurs and the involved nodes return to the BACKOFF state). Any successfully transmitted AVAIL will cause the nodes waiting in BACKOFF to become NON-SCHEDULERS.

The backoff state is necessary because a collision may occur during the Time Measurement phase when two nodes simultaneously attempt to transmit a TM frame on the same wavelength. The backoff mechanism ensures that both nodes can eventually complete the TM phase without collisions occurring.

To prevent two or more nodes from mistakenly believing they have emerged victorious from the election, the times T2 and T3 must obey a particular relationship. If ND is defined as the Network Diameter, or the longest one-way propagation time between any two nodes, then the following relationship exists: $2*ND<T3<T2$.

The first inequality is defined as follows: If more than one node is an ANNOUNCED-CONTENDER, then the first inequality ensures that the node with the highest MAC ID will win (in particular, it ensures that all nodes with lower MAC IDs will wait long enough in state ANNOUNCED-CONTENDER to hear the AVAIL from the node with highest MAC ID). The second inequality is defined as follows: if node B is busy retuning its receiver to $\lambda_0$, transitioning from CHECKING to SILENT-CONTENDER, and the retuning is completed just after node A's AVAIL1 has passed by, then the second inequality will ensure that node B will hear node A's AVAIL2 before node B becomes an ANNOUNCED-CONTENDER itself.

When a node reaches the SILENT-CONTENDER state, both its transmitter and receiver are tuned to $\lambda_0$. When a node then transmits AVAIL1, it becomes an ANNOUNCED-CONTENDER and sets the announced_timer for T3. Since the node should hear the echo of its own AVAIL I transmission (provided the corresponding receiver is functional), it takes advantage of this opportunity to execute Time Measurement, that is, to calculate its Passive Star Coupler (PSC) offset. The longest amount of time a node would have to wait to hear the echo is defined as ND, however, the announced_timer requires that the node remain in the ANNOUNCED-CONTENDER state for a time T3 before becoming the scheduler. Therefore, the avail_echo_timer should be set for a time longer than ND but less than T3. Since the inequality 2×ND<T3 must hold, then the avail_echo_timer can be set for (2×ND).

If the AVAIL echo is heard, the avail_echo_timer is turned off. If the AVAIL echo is not heard, then the avail_echo_timer will expire before the announced_timer expires, causing the node to abort the election and then move into Error Mode.

By bundling Time Measurement with Election, the new master node will be cognizant of PSC offset and be assured of having a functioning transmitter and receiver.

Time Measurement Mode

Once a master node has been elected, it circulates the scheduling and synchronization information in SYNC-SCHED frames, enabling other nodes to join the network. A node formally joins the network of the present invention by proceeding through the Time Measurement Mode and the Join Mode. In Time Measurement Mode, a node calculates its PSC offset—the propagation delay to the PSC, as described above. All times are measured locally, and the transmissions are done in relation to the PSC time. Since collisions can occur only at the PSC, each node uses its PSC offset to ensure that its transmissions reach the PSC at the exact time prescribed by the schedule.

To synchronize its system time, a node must calculate its PSC offset, the time needed for a transmission to reach the PSC. The TM frame is the mechanism for calculating the PSC offset. The master node will periodically place a TM window at the end of a superframe on all wavelengths. The master node will then announce the presence of the TM window to all nodes in the network by setting a bit in the SYNCHSCHED frame. Further, the SYNCHSCHED frame includes the duration time until the TM window will appear; this value will vary from wavelength to wavelength, since SYNCHSCHED frames appear on each wavelength at different points in time.

A software signal to >tm< begins the Time Measurement mode. The node listens until it hears SYNCHSCHED frame with the bit set, indicating that a TM frame is attached to the end of this particular superframe. It then sets the tm_timer for the duration time until the TM window appears, waits for the timer to expire and then transmits a time stamped TM frame on its receive wavelength. When the node hears its own transmission of the TM frame, it copies the frame's timestamp and the current time into variable fields tm-out and tm-in and signals the offset calculating module. The offset calculating module then divides the difference of these two values by two to yield the PSC offset.

Join Mode

Following Time Measurement Mode a node enters Join Mode. The node first lets the master node know of its traffic demands via the JOINOCC frame, so that the current schedule can be expanded to include this new demand. The joining node must then wait until it receives a new schedule that includes its request.

It should be noted that it is possible for a collision to occur when two or more nodes simultaneously attempt to join the network of the present invention. Two nodes assigned to the same listening wavelength could experience a collision during Time Measurement, or two nodes may transmit a JOINOCC frame to the master node during the same JOINOCC window. The protocol includes conventional backoff algorithms to resolve such contention.

For a new node, the Join mode can be separated into two parts, (a) informing the master node of its presence in the network and (b) waiting for the master node to include the new node in the schedule.

The new node must learn when the JOINOCC window will occur, so that the new node can transmit a JOINOCC frame to the master node. It learns by listening on the new node's receive wavelength until it receives a SYNCSCHED frame with the bit set to ensure that the schedule included in the SYNCHSCHED frame is the one currently in effect (as opposed to future use). From the SYNCSCHED frame the new node extracts data fields and stores them in the new nodes corresponding local variables. The extracted data fields include the master node's receive wavelength, the length of the superframe, the offset time of the SYNCHSCHED frame on the new node's receive wavelength and the offset time of the JOINOCC window on the master node's receive wavelength. Additionally, the node stores the time from the local clock that the SYNCSCHED frame arrived. From these values the new node can calculate the time that the start of the superframe occurred at the PSC and the time that it must transmit a JOINOCC frame in order to meet the JOINOCC window. The transmitted JOINOCC frame will include a checksum so that the master node can determine that it has received the correct information.

Since the new node's receive wavelength is not necessarily the same as the master node's receive wavelength, the new node will be unable to directly detect a collision in the JOINOCC window. Once the JOINOCC frame has been sent, the only way for the new node to learn that it has successfully been included in the network is to receive a new schedule, via the SYNCHSCHED frame, which includes the new nodes MAC address. The new schedule will indicate the windows in which the new node may transmit on each wavelength.

To accommodate for the possible collision of JOINOCC frames, the new node sets a counter to the value OLD_SCHED_MAX after it transmits a JOINOCC frame. While waiting to receive a new schedule that includes the new node MAC address, the new node decrements the counter each time it receives a SYNCSCHED frame that lacks the new node's MAC address. If the counter should reach zero, the new node notifies the signaling module and exits the Join Mode. The signaling module may either retry the Join Mode process or, after repeated failures, the Join Mode may be terminated.

If the new node receives a new schedule that includes the new nodes MAC address, then the new node copies the necessary timing information from the SYCHSCHED frame into the corresponding local variables locations and signals the signaling module that it has successfully joined the network.

If a new node exits the TM receive hardware state machine >tm< with a signal to the backoff module, the module may execute an exponential backoff algorithm. As previously noted, the backoff algorithm ensures that both nodes can eventually complete the TM phase without collisions occurring.

If a new node exits >tm< with a "no_tm_window" signal being sent to the backoff module, the module decrements the counter and immediately restarts time measurement, without backing off. The module allows a total of "x" failures of this kind before moving to the error mode.

If a new node exits >join< with the signal "no_new_sched" to the backoff module, the module may execute an exponential backoff algorithm.

Routine Mode

After successfully joining the network, a new node enters Routine Mode, where it remains indefinitely unless an error condition occurs. During Routine Mode, the receive hardware extracts the schedule from the arriving SYNCSCHED frames and forwards incoming data frames to the driver. Meanwhile, the transmit hardware transmits control frames and data frames from its wavelength queues onto the appropriate outgoing wavelengths, according to the current schedule. These transmissions include sending an OCC frame to the master node, once per superframe, to communicate its packet queue occupancies; as previously discussed the master node uses the data in the OCC frames to calculate new schedules. In contrast to the Time Measurement and Join modes, Routine Mode is collision-free. The PSC offset, first measured during Time Measurement, is also measured periodically during Routine Mode, in a collision-free manner.

The Routine Mode is collision free, because unlike the TM mode and the Join mode, the Routine Mode operates under a schedule, i.e., a packet cannot be transmitted by a node without the packet first being scheduled for delivery at a predetermined point in time and on a specific wavelength.

A new node enters Routine Mode once it has successfully joined the network; during >join< it received a SYNC-SCHED frame that included the new node's MAC address in the schedule and the new node exited >join< with a message sent to the signaling controller. The main function of the receive hardware in the routine mode are to forward incoming data frames to the signaling controller and to extract the schedule from the SYNCSCHED frame. The transmission hardware in the routine mode transmits control frames and data frames from wavelength queues onto the appropriate outgoing wavelengths, according to the current schedule.

In the receive hardware, when a SYNCSCHED frame is received, the receive hardware first checks whether its own MAC address is included in the schedule. If the node has for some reason been omitted from the schedule, the receive hardware notifies the signaling controller with a "not_in_sched" signal and returns to an idle state. The signaling controller then exits Routine Mode and moves to Error Mode.

If the node is in the schedule, then the receive hardware copies synchronization information from SYNCHSCHED and checks whether the active bit is set. If the active bit is set, the node will continue to operate according to the schedule. If, however, the active bit is not set, then the schedule being disseminated in the SYNCSCHED frame is a newly calculated schedule that will go into effect after subsequent superframes.

When the receive hardware encounters a SYNCHSCHED frame without the active bit set, it checks the status of the reserve memory bank. If the status is invalid, then all the new synchronization and scheduling information in the new schedule has yet to be copied into the reserve memory bank. After this information is copied, the receive hardware sets this bank's status to valid.

There are three states in the receive hardware: idle, routine listen and in schedule. From the idle state the receive hardware will receive a start routine signal from the signal controller that notifies the node that it has successfully joined the network. The start routine signal will transition the receive hardware to the routine listen state.

In the routine listen state data frames are received by the receive hardware that will prompt transition to other states. If a DATA frame is received on the listening wavelength the frame is forwarded to the frame handling layer and the receive hardware returns to the routine listen state. If an ARP frame is received on the listening wavelength, the new information is copied into the ARP table and the receive hardware returns to the routine listen state. If a SYNCSCHED frame is received that includes scheduling information for the node, then the timing information is saved and the node moves to the in schedule state. If a SYCNSCHED frame is received that does not include scheduling information for this node, then the status of the memory banks is marked invalid, a not in schedule signal is sent to the signal controller and the node moves to the idle state. If a stop routine signal is received an error condition has been determined and the node moves to the idle state. If the node fails to receive a SYNCSCHED within the allotted time period then the node moves to the idle state.

In the in schedule state data frames are received by the receive hardware that will prompt transition to other states. If an ARP frame is received on the listening wavelength, the new information is copied into the ARP table and the receive hardware returns to the in schedule state. If a stop routine signal is received an error condition has been determined and the node moves to the idle state. If the active bit in the newly arrived SYNCSCHED frame is set, indicating that no countdown has begun to switch to a new schedule, then the schedule timer is reset and the node moves to the routine listen state. If the active bit in the newly arrived SYNCHSCHED frame is not set and status is valid, then countdown has begun to switch to a new schedule and the new schedule has already been copied into the reserve memory bank. In this scenario the schedule timer is reset and the node moves to the routine listen state. If the active bit in the newly received SYNCHSCHED frame is not set and the status is invalid, then countdown has begun to switch to a new schedule but the new schedule has not yet been copied into the reserve memory bank. In this instance the new schedule is copied into the memory bank, the timing information is saved and the node moves to the routine listen state.

The transmit hardware will be initiated once the Join Routine has been successfully implemented. The Join Routine is completed by placing the current schedule and the synchronization information into the memory bank. The transmit hardware confirms this operation by validating the memory bank status. At this stage, the transmit hardware is ready to begin processing superframes.

At the start of the superframe the transmit hardware will set the current schedule to the schedule found in the memory bank and will set the index for schedchunk to zero. This index will be incremented after the node completes its transmission on each successive wavelength. In this manner the node is able to recognize when it is done with transmission of the current superframe. Additionally, the transmit hardware will set the PSC offset time to the time that the superframe began at the PSC.

Transmission of the superframes by the transmit hardware is accomplished according to the information in the current schedchunk. At the start of the schedchunk the transmit hardware sets the transmit wavelength as prescribed by the schedule and sets the current transmit queue to correspond to the transmit wavelength. A start transmit time and an end transmit time are then calculated to signify the time at which transmission of frames can commence and the last instant at which transmission of a frame can begin (i.e., the end of transmission).

Once the start transmit time arrives the transmit hardware will begin transmitting frames. If the transmit wavelength is set to the receive wavelength of the master node, then the first frame transmitted will be an OCC frame that informs the master node of its queue occupancies. If the transmit wavelength is set to the node's own receive wavelength, then the first frame transmitted will be a TM frame, to accomplish the routine time measurement procedure. In all other instances, the transmit hardware will transmit DATA frames from the current queue.

The transmitting node will transmit DATA frames from the current queue back-to-back, without waiting for the beginning of a new slot. Just prior to transmitting each frame, the node checks to make sure that the current time has not exceeded the end transmit time. Once the end transmit time has lapsed, transmissions on the wavelength must cease. The index for current schedchunk is incremented and then checked to determine if the end of the schedule has arrived. If the end of the schedule has not arrived, then the transmit hardware proceeds to the next schedchunk.

Scheduling Mode

The receive state machine for scheduling retains all the functionality of the routine state machine, but possesses two extra transitions to aid in collection of information needed to compute the schedule. Each of the additional transitions is a self transition from a routine listen state. First, receipt of an OCC frame on the listening wavelength will prompt the forwarding of the frame to the signaling controller and return to the routine listen state. Second, receipt of a JOINOCC frame on the listening wavelength will prompt the forwarding of the frame to the signaling controller and return to the routine listen state.

The transmit state machine for scheduling retains all the functionality of the routine state machine, however the transition from the END of Schedchunk state to the end of Schedule state becomes split into two, in order to aid in the transmission of a newly-calculated schedule. Both transitions first check to make certain the end of schedule has been reached. Next, a determination is made to verify that a newly calculated schedule exists in memory. If no schedule is determined, no action is taken. If a schedule is determined, then the node copies the new schedule as the current schedule so that it can be disseminated in the next superframe.

Scheduling Algorithm

As previously stated, the master node receives an OCC frame, containing packet queue occupancies, from each node once per superframe. The master node may also receive a JOINOCC frame, containing packet queue occupancies, from a new node wishing to join the network. From this information, the master node can build the traffic matrix A, an N×C matrix, where N is the number of nodes in the network, C is the number of wavelengths, and entry aij represents the number of slots requested by node i for transmission on $\lambda j$. For a network of C=3 wavelengths and n=5 nodes, a sample traffic matrix is shown in Table 3.

TABLE 3

Example traffic matrix

| | $\lambda_1$ | $\lambda_2$ | $\lambda_3$ | sum |
|---|---|---|---|---|
| $n_1$ | 4 | 1 | 3 | 8 |
| $n_2$ | 2 | 3 | 2 | 7 |
| $n_3$ | 3 | 2 | 1 | 6 |
| $n_4$ | 2 | 3 | 1 | 6 |
| $n_5$ | 1 | 1 | 2 | 4 |
| Sum | 12 | 10 | 9 | |

The network of the present invention may implement as the scheduling algorithm one-pass greedy scheduling algorithm or a similar scheduling algorithm. The algorithm creates a schedule from t=0 forward in time without backtracking, always attempting to schedule the highest priority node on the highest priority wavelength. Higher priority is assigned to nodes (respectively, wavelengths) that have higher corresponding row-sums (respectively, column-sums) in the traffic matrix A. In the sample traffic matrix above, the nodes have been renumbered in order of largest row-sum to smallest, such that $n_1$ has the largest row-sum and $n_N$ has the smallest, with ties being broken arbitrarily. Likewise, the wavelengths have been renumbered in order of largest column-sum to smallest, such that $\lambda 1$ has the largest column-sum and $\lambda_C$ has the smallest. The traffic matrix gives rise to two lower bounds on the schedule length. The maximum column-sum is the channel bound; a schedule can be no shorter than the total demand for any one wavelength. The maximum row-sum plus C tuning latencies is called the node bound; in order to meet the demand of $n_1$, a schedule must be at least long enough for $n_1$ to transmit all its traffic and tune to each of the three wavelengths. The maximum of the channel and node bounds is the greatest lower bound on the schedule length.

The algorithm developed for the original HiPeR-1 scheduler produces near optimal (very short in length) schedules, but requires a prohibitively long runtime. In particular, the original HiPeR-1 scheduler has a worst-case runtime of $O(CN^4)$. The scheduler developed for the network of the present invention is a straightforward greedy scheduler that has a worst-case runtime of $O(C^2N^2)$. This speedup is substantial because the number of nodes is typically much larger than the number of channels. Moreover, the faster scheduler can be readily implemented in hardware, resulting in an additional gain in speed. To achieve these gains in speed and simplicity, the scheduler of the present invention produces schedules that are not as near-to-optimal as those produced by the original HiPeR-1 scheduler. However, the faster scheduler's results are "reasonably close" to optimal. In simulations with various patterns of network traffic demand, the new scheduler will produce schedules within 5% of the optimal schedule, approximately 95% of the time.

The histogram shown in FIG. 9 corresponds to a network with balanced traffic demand; that is, each node determines its demand for each wavelength by drawing from the same distribution (equally likely over the set $\{0, 1, \ldots, 20\}$). For each set of traffic demands, the ratio of the lengths of the two schedules generated are examined, one from the scheduler of the present invention and one from the original HiPeR-1 scheduler. The histogram was created from 100,000 replications. The height of each box shows the number of times that the ratio of the schedule of the present invention to the original schedule fell within the range indicated. For example, nearly 58,000 or 58% of the replications resulted in ratios between 1.00 and 1.01. Furthermore, in 95% of the replications, the scheduler of the present invention produced a schedule that was no more than 3% longer than the schedule produced by the original HiPeR-1 scheduler (corresponding to ratios between 1.00 and 1.03).

The scheduling algorithm of the present invention comprises two steps. First, an initial schedule is built based on traffic reservations for the two classes of Diffserv traffic that require bandwidth and/or delay guarantees: the Expedited Forwarding (EF) class and the Assured Forwarding (AF) class. This schedule is such that all nodes can meet the QoS guarantees for their EF and AF traffic. This initial schedule is then extended to assign transmission slots for best-effort (BE) traffic, using an algorithm that ensures two important properties in the final schedule: first, that the QoS of the EF and AF traffic is not compromised for any node; and second, that best-effort transmissions are assigned to the various nodes in a max-min fair fashion. This latter property guarantees that the excess bandwidth in the network of the present invention is allocated fairly among the network flows. Another important feature of our guaranteed-service scheduling algorithms is that they require only small changes to the basic scheduling algorithm.

Thus, the present invention provides for an optical-inclusive, dWDM network and the accompanying signaling protocol necessary to facilitate communication between nodes in the network. This network architecture distinguishes itself from previous network architecture in that it provides for a packet-oriented network, independent of the number of nodes and the number of supported wavelengths, and provides for scheduled access to the medium, which guarantees higher utilization.

Many modifications and other embodiments of the invention will come to mind to one skilled in the art to which this invention pertains having the benefit of the teachings pre- That which is claimed:

1. An optical-inclusive dense wavelength division multiplexing network, the network comprising:
   a passive star coupler that serves as a network hub;
   one or more candidate nodes in optical communication with the passive star coupler, the one or more candidate nodes including a fast tunable transmitter and a slowly tunable receiver for receiving and transmitting optical signals, the one or more candidate nodes implementing an election algorithm to elect a scheduling entity from amongst the one or more candidate nodes; and
   a master node in optical communication with the passive star coupler and selected from amongst the one or more candidate nodes to serve as the scheduling entity, the master node implementing a scheduling algorithm that schedules the transmission of at least two service classes of data frames allocated between different candidate wavelengths throughout the network based on scheduling constraints imposed by at least one of the service classes for delivery of the data frames,
   said scheduling algorithm determining a priority for transmission of scheduled data frames from the one or more candidate nodes by 1) calculating for each candidate node a total number of data frames regardless of wavelength to be transmitted and 2) calculating for each candidate wavelength a total number of data frames regardless of node to be transmitted,
   wherein the node with the highest total number of data frames regardless of wavelength determines node transmission priority and the highest total number of data frames regardless of node determines wavelength transmission priority.

2. The network of claim 1, wherein the fast tunable transmitter is further defined as a transmitter having tuning times of less than about 1 microsecond and the slowly tunable receiver is further defined as a receiver having tuning times greater than about 100.0 micro-seconds.

3. The network of claim 1, further comprising one or more slave nodes that are in optical communication with the passive star coupler and receive scheduling data from the master node.

4. The network of claim 1, wherein the scheduling algorithm is further defined as a one-pass greedy scheduling algorithm.

5. The network of claim 1, wherein the at least two service classes comprise at least two of:
   an expedited forwarding class;
   an assured forwarding class; and
   a best-efforts class.

6. The network of claim 1, wherein the constraint comprises a quality of service guarantee.

7. The network of claim 1, wherein wavelength resources are allocated among the candidate nodes such that excess bandwidth is distributed among network flow of the data frames throughout the network.

8. The network of claim 1, wherein the scheduling algorithm comprises a traffic matrix in which rows of the traffic matrix are associated with respective ones of the candidate nodes, columns of the traffic matrix are associated with respective ones of the candidate wavelengths, and entries in the traffic matrix show for each node and each wavelength the number of the scheduled data frames to be transmitted, and
   the scheduling algorithm determines 1) respective row summations for each of the candidate nodes of all scheduled data frames to be transmitted for a particular node and 2) respective column summations for each of the candidate wavelengths of all scheduled data frames to be transmitted for a particular wavelength, and
   wherein the highest row summation determines said node transmission priority and the highest column summation determines said wavelength transmission priority.

9. A node within an optical-inclusive dense wavelength division multiplexing network, the node comprising:
   a fast tunable transmitter for optically transmitting data frames to a slowly tunable receiver for optically receiving data frames;
   a plurality of queues that buffer the data frames, prior to transmission, on a per-wavelength basis;
   a queue manager that controls which frames are transmitted from the plurality of queues in accordance with a scheduling algorithm; and
   an election module that implements an election routine to elect a scheduling node from a plurality of predetermined nodes within the network with the scheduling node being elected configured to schedule the transmission of at least two service classes of data frames allocated between different candidate wavelengths throughout the network based on scheduling constraints imposed by at least one of the service classes for delivery of the data frames,
   said scheduling algorithm determining a priority for transmission of scheduled data frames from the one or more candidate nodes by 1) calculating for each candidate node a total number of data frames regardless of wavelength to be transmitted and 2) calculating for each candidate wavelength a total number of data frames regardless of node to be transmitted,
   wherein the node with the highest total number of data frames regardless of wavelength determines node transmission priority and the highest total number of data frames regardless of node determines wavelength transmission priority.

10. The node of claim 9, further comprising a first look-up table that enables a network node to perform Internet Protocol to Medium Access Control (IP-to-MAC) address resolution.

11. The node of claim 10, further comprising a second look-up table that enables a network node to perform MAC-to-receive wavelength resolution.

12. The node of claim 9, further comprising a join algorithm that is implemented to allow additional nodes to join the network.

13. The node of claim 9, wherein the scheduling algorithm is implemented by an elected scheduling node and calculates data packet delivery schedules for all nodes in the network.

14. The node of claim 9, further comprising a scheduling management module that manages the scheduling of data transmission.

15. The node of claim 9, further comprising a synchronization module that provides synchronization of transmissions between the node and a passive star coupler.

16. The node of claim 9, wherein the fast tunable transmitters are further defined as transmitters having tuning times of less than about 1 microsecond.

17. The node of claim 9, wherein the slowly tunable receivers are further defined as receivers having tuning times greater than about 100 microseconds.

18. The node of claim 9, wherein the at least two service classes comprise at least two of:
an expedited forwarding class;
an assured forwarding class; and
a best-efforts class.

19. The node of claim 9, wherein the constraint comprises a quality of service guarantee.

20. The node of claim 9, wherein wavelength resources are allocated among the candidate nodes such that excess bandwidth is distributed among network flow of the data frames throughout the network.

21. The node of claim 9, wherein the scheduling algorithm comprises a traffic matrix in which rows of the traffic matrix are associated with respective ones of the candidate nodes, columns of the traffic matrix are associated with respective ones of the candidate wavelengths, and entries in the traffic matrix show for each node and each wavelength the number of the scheduled data frames to be transmitted, and
the scheduling algorithm determines 1) respective row summations for each of the candidate nodes of all scheduled data frames to be transmitted for a particular node and 2) respective column summations for each of the candidate wavelengths of all scheduled data frames to be transmitted for a particular wavelength, and
wherein the highest row summation determines said node transmission priority and the highest column summation determines said wavelength transmission priority.

22. A method for electing a scheduling node in an optical-inclusive dense Wavelength Division Multiplexing (dWDM), Local Area Network (LAN), the method comprising:
failing to detect, at one or more candidate nodes, the presence of a scheduling node within the network;
tuning the one or more candidate node receivers and transmitters to an election wavelength;
announcing to the network that one or more candidate nodes are available as candidates for scheduling node election; and
electing one of the one or more announced candidate nodes as the scheduling node.

23. The method of claim 22, wherein the step of electing one of the one or more announced candidate nodes as the scheduling node further comprises electing one of the one or more announced candidate nodes as the scheduling node based on the timing of the announcements to the network that the candidate nodes are available for election.

24. The method of claim 22, wherein the step of electing one of the one or more announced candidate nodes as the scheduling node further comprises electing one of the one or more announced candidate nodes as the scheduling node based on highest Media Access Control (MAC) Identifier (ID) of one or more announced candidate nodes.

* * * * *

UNITED STATES PATENT AND TRADEMARK OFFICE
CERTIFICATE OF CORRECTION

PATENT NO. : 7,496,295 B2  Page 1 of 1
APPLICATION NO. : 10/268424
DATED : February 24, 2009
INVENTOR(S) : Baldine et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 944 days Delete the phrase "by 944 days" and insert -- by 1,302 days --

Signed and Sealed this

Fifteenth Day of June, 2010

David J. Kappos
*Director of the United States Patent and Trademark Office*